United States Patent
Slavens et al.

(10) Patent No.: US 10,385,728 B2
(45) Date of Patent: Aug. 20, 2019

(54) AIRFOIL CONTOUR FOR LOW-LOSS ON-BOARDING OF COOLING AIR THROUGH AN ARTICULATING SPINDLE

(71) Applicant: United Technologies Corporation, Farmington, CT (US)

(72) Inventors: Thomas N. Slavens, Vernon, CT (US); Eric A. Grover, Tolland, CT (US); John D. Teixeira, Palm City, FL (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 604 days.

(21) Appl. No.: 15/034,951

(22) PCT Filed: Nov. 3, 2014

(86) PCT No.: PCT/US2014/063652
§ 371 (c)(1),
(2) Date: May 6, 2016

(87) PCT Pub. No.: WO2015/073242
PCT Pub. Date: May 21, 2015

(65) Prior Publication Data
US 2016/0290158 A1    Oct. 6, 2016

Related U.S. Application Data

(60) Provisional application No. 61/904,007, filed on Nov. 14, 2013.

(51) Int. Cl.
*F01D 25/12*   (2006.01)
*F01D 17/16*   (2006.01)
(Continued)

(52) U.S. Cl.
CPC .............. *F01D 25/12* (2013.01); *F01D 5/02* (2013.01); *F01D 5/12* (2013.01); *F01D 5/141* (2013.01);
(Continued)

(58) Field of Classification Search
CPC ... F01D 9/00; F01D 9/06; F01D 9/065; F01D 17/00; F01D 17/10; F01D 17/12;
(Continued)

(56) References Cited

U.S. PATENT DOCUMENTS 4,163,629 A * 8/1979 McDonough ............. F01D 5/18
  415/115
4,169,692 A * 10/1979 McDonough ........... F01D 5/189
  415/115

(Continued)

OTHER PUBLICATIONS

International Preliminary Report on Patentability for International Application No. PCT/US2014/063652 dated May 26, 2016.
(Continued)

*Primary Examiner* — William H Rodriguez
*Assistant Examiner* — Kyle Robert Thomas
(74) *Attorney, Agent, or Firm* — Carlson, Gaskey & Olds, P.C.

(57) ABSTRACT

A turbine stator vane assembly for a gas turbine engine is disclosed and includes an airfoil rotatable about an axis transverse to an engine longitudinal axis. The airfoil includes outer walls defining an inner chamber between a pressure side and a suction side of the airfoil. At least one spindle supports rotation of the airfoil and includes a feed opening for communicating cooling air into the inner chamber. An inlet defines a passage between the feed opening and the inner chamber and includes a protrusion of the outer wall on at least one of the pressure side and suction side of the airfoil.

22 Claims, 6 Drawing Sheets

(51) Int. Cl.
   *F01D 5/14*    (2006.01)
   *F01D 9/04*    (2006.01)
   *F01D 9/06*    (2006.01)
   *F01D 5/02*    (2006.01)
   *F01D 5/12*    (2006.01)
   *F01D 17/14*   (2006.01)
   *F02C 3/04*    (2006.01)

(52) U.S. Cl.
   CPC ............ *F01D 9/04* (2013.01); *F01D 9/041* (2013.01); *F01D 9/065* (2013.01); *F01D 17/14* (2013.01); *F01D 17/16* (2013.01); *F01D 17/162* (2013.01); *F02C 3/04* (2013.01); *F05D 2220/32* (2013.01); *F05D 2240/35* (2013.01); *F05D 2260/20* (2013.01)

(58) Field of Classification Search
   CPC ........ F01D 17/14; F01D 17/16; F01D 17/162; F01D 25/08; F01D 25/12; F01D 5/141; F01D 5/147; F05D 2220/3212; F05D 2240/128
   See application file for complete search history.

(56) References Cited

U.S. PATENT DOCUMENTS 4,798,515 A * 1/1989 Hsia .................. F01D 5/18
                                              415/115
   4,861,228 A   8/1989  Todman
   5,184,459 A   2/1993  McAndrews
   5,207,556 A   5/1993  Frederick et al.
   5,622,473 A   4/1997  Payling
   6,305,155 B1  10/2001 Gross
   6,461,105 B1  10/2002 Nicolson
   7,866,652 B2  1/2011  Fujita et al.
   8,105,019 B2  1/2012  McCaffrey et al.
   8,123,471 B2  2/2012  Mielke et al.
   2003/0017051 A1* 1/2003 Coutandin .......... F01D 5/187
                                              416/97 R
   2009/0067978 A1* 3/2009 Suljak, Jr. .......... F01D 17/162
                                              415/1
   2010/0202873 A1  8/2010  Andrew
   2012/0093632 A1  4/2012  Crespo et al.
   2012/0263571 A1  10/2012 Ress, Jr.

OTHER PUBLICATIONS

International Search Report and Written Opinion for International Application No. PCT/US2014/063652 dated Feb. 10, 2015.

European Search Report for EP Application No. 14862100.6 dated Nov. 28, 2016.

* cited by examiner

AIRFOIL CONTOUR FOR LOW-LOSS ON-BOARDING OF COOLING AIR THROUGH AN ARTICULATING SPINDLE

REFERENCE TO RELATED APPLICATION

This application claims priority to U.S. Provisional Application No. 61/904,007 filed on Nov. 14, 2013.

STATEMENT REGARDING FEDERALLY SPONSORED RESEARCH OR DEVELOPMENT

The subject of this disclosure was made with government support under Contract No.: N00014-09-D-0821-0006 awarded by the United States Navy. The government therefore may have certain rights in the disclosed subject matter.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Turbine section operating temperatures are typically beyond the capabilities of component materials. Due to the high temperatures, air is extracted from other parts of the engine and used to cool components within the gas path. The increased engine operating temperatures provide for increased operating efficiencies.

Additional engine efficiencies are realized with variable compressor and turbine vanes that provide for variation in the flow of gas flow to improve fuel efficiency during operation. Variable vanes within a turbine section provide airflow through spindles about which the vanes rotate. Openings and restrictions to airflow through spindles can be a limiting factor on cooling performance for a turbine vane.

Turbine engine manufacturers continue to seek further improvements to engine performance including improvements to thermal, transfer and propulsive efficiencies.

SUMMARY

A vane assembly for a gas turbine engine according to an exemplary embodiment of this disclosure, among other possible things includes an airfoil rotatable about an axis transverse to an engine longitudinal axis. The airfoil includes outer walls defining an inner chamber between a pressure side and a suction side of the airfoil. At least one spindle supports rotation of the airfoil. The at least one spindle includes feed opening for communicating cooling air into the inner chamber. An inlet defines a passage between the feed opening and the inner chamber. The inlet is defined by a protrusion of the outer wall on at least one of the pressure side and suction side of the airfoil.

In a further embodiment of any of the foregoing vane assemblies, the protrusion extends outward from a pressure side of the airfoil.

In a further embodiment of any of the foregoing vane assemblies, the protrusion extends outward from a suction side of the airfoil.

In a further embodiment of any of the foregoing vane assemblies, the at least one spindle includes an outer spindle and an inner spindle each including a feed opening and the inlet includes an outer inlet and an inner inlet each forming a protrusion on the outer wall.

In a further embodiment of any of the foregoing vane assemblies, the passage is defined by the inlet tapers from a first width defined by the feed opening to a second width smaller than the first width defined by the inner chamber.

In a further embodiment of any of the foregoing vane assemblies, the protrusion includes an ellipsoid shape extending from at least one of the pressure side and suction side of the airfoil.

In a further embodiment of any of the foregoing vane assemblies, the pressure side and suction side extend a first radial length from an inner side to an outer side and the protrusion is less than the first length.

In a further embodiment of any of the foregoing vane assemblies, the protrusion includes a first protrusion extending radially inward from the outer side and a second protrusion extending radially outward from the inner side.

In a further embodiment of any of the foregoing vane assemblies, includes an outer platform and an inner platform with the airfoil supported between the outer platform and the inner platform.

In a further embodiment of any of the foregoing vane assemblies, includes a fixed airfoils supported between the inner platform and the outer platform adjacent the airfoil.

A turbine section of a gas turbine engine according to an exemplary embodiment of this disclosure, among other possible things includes at least one rotor supporting rotation of a plurality of blades about an engine longitudinal axis, and at least one variable vane rotatable about an axis transverse to the engine rotational axis for varying a direction of airflow. The variable vane includes an airfoil rotatable about an axis transverse to an engine longitudinal axis. The airfoil includes outer walls defining an inner chamber between a pressure side and a suction side of the airfoil. At least one spindle supports rotation of the airfoil. The at least one spindle includes feed opening for communicating cooling air into the inner chamber. An inlet defines a passage between the feed opening and the inner chamber. The inlet is defined by a protrusion of the outer wall on at least one of the pressure side and suction side of the airfoil.

In a further embodiment of any of the foregoing turbine sections, the at least one spindle includes an outer spindle and an inner spindle each including a feed opening and the inlet includes an outer inlet and an inner inlet each forming a protrusion on the outer wall.

In a further embodiment of any of the foregoing turbine sections, the passage defined by the inlet tapers from a first width defined by the feed opening to a second width smaller than the first width defined by the inner chamber.

In a further embodiment of any of the foregoing turbine sections, the protrusion includes an ellipsoid shape extending from at least one of the pressure side and suction side of the airfoil.

In a further embodiment of any of the foregoing turbine sections, includes an outer platform and an inner platform with the variable vane supported adjacent a fixed vane between the outer platform and the inner platform.

In a further embodiment of any of the foregoing turbine sections, includes a plurality of variable vanes and a plurality of fixed vanes defining a vane stage of the turbine section and alternating about the engine longitudinal axis.

A gas turbine engine according to an exemplary embodiment of this disclosure, among other possible things includes a compressor section, a combustor in fluid communication with the compressor section, and a turbine section in fluid communication with the combustor. The turbine section includes at least one rotor supporting rotation of a plurality of blades about an engine longitudinal axis. At least one variable vane rotatable about an axis transverse to the engine rotational axis for varying a direction of airflow. The variable vane includes an airfoil rotatable about an axis transverse to an engine longitudinal axis. The airfoil includes outer walls defining an inner chamber between a pressure side and a suction side of the airfoil. At least one spindle supports rotation of the airfoil. The at least one spindle includes feed opening for communicating cooling air into the inner chamber. An inlet defines a passage between the feed opening and the inner chamber. The inlet is defined by a protrusion of the outer wall on at least one of the pressure side and suction side of the airfoil.

In a further embodiment of any of the foregoing gas turbine engines, the at least one spindle includes an outer spindle and an inner spindle each including a feed opening and the inlet includes an outer inlet and an inner inlet each forming a protrusion on the outer wall.

In a further embodiment of any of the foregoing gas turbine engines, the passage is defined by the inlet tapers from a first width defined by the feed opening to a second width smaller than the first width defined by the inner chamber.

In a further embodiment of any of the foregoing gas turbine engines, includes an outer platform and an inner platform with the variable vane supported adjacent a fixed vane between the outer platform and the inner platform.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
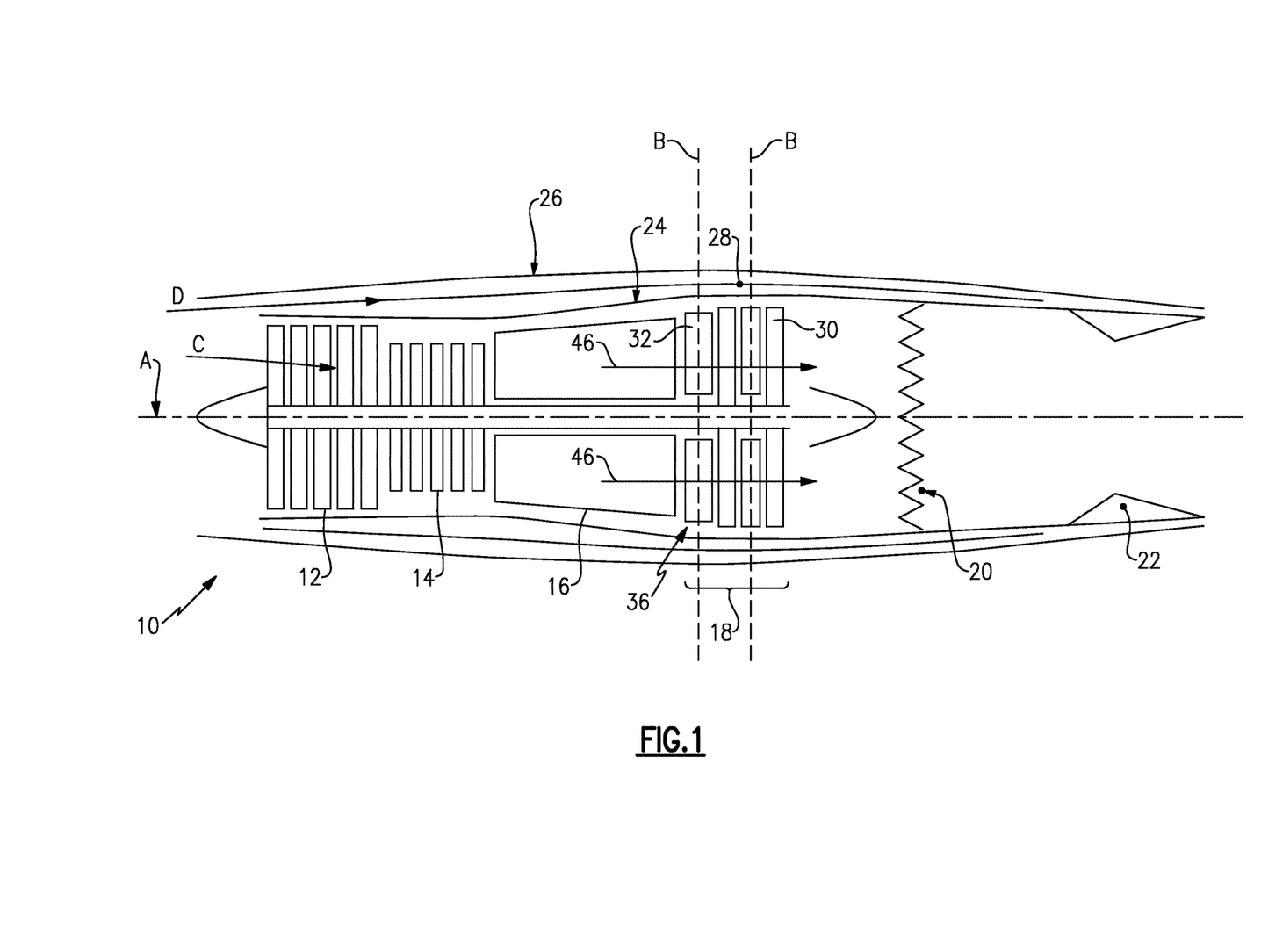
FIG. 1 is a schematic view of an example gas turbine engine.

FIG. 1 schematically illustrates a gas turbine engine 10. The example gas turbine engine 10 is a two-spool turbofan that generally incorporates a fan section 12, a compressor section 14, a combustor section 16 and a turbine section 18. Alternative engines might include an augmentor section 20 among other systems or features.

The fan section 12 drives air along a bypass flow path 28 in a bypass duct 26. A compressor section 14 drives air along a core flow path C into a combustor section 16 where fuel is mixed with the compressed air and ignited to produce a high energy exhaust gas flow. The high energy exhaust gas flow expands through the turbine section 18 to drive the fan section 12 and the compressor section 14. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

In this example, the gas turbine engine 10 includes a liner 24 that surrounds a core engine portion including the compressor section 14, combustor 16 and turbine section 18. The duct 26 is disposed radially outside of the liner 24 to define the bypass flow path 28. Airflow is divided between the core engine where it is compressed and mixed with fuel and ignited to generate the high energy combustion gases and airflow that is bypassed through the bypass passage to increase engine overall efficiency.

The example turbine section 18 includes rotors 30 that support turbine blades that convert the high energy gas flow to shaft power that, in turn, drives the fan section 12 and the compressor section 14. In this example, stator vanes 32 are disposed between the rotating turbine vanes 30 and are variable to adjust the rate of high energy gas flow through the turbine section 18.

Figure 2:
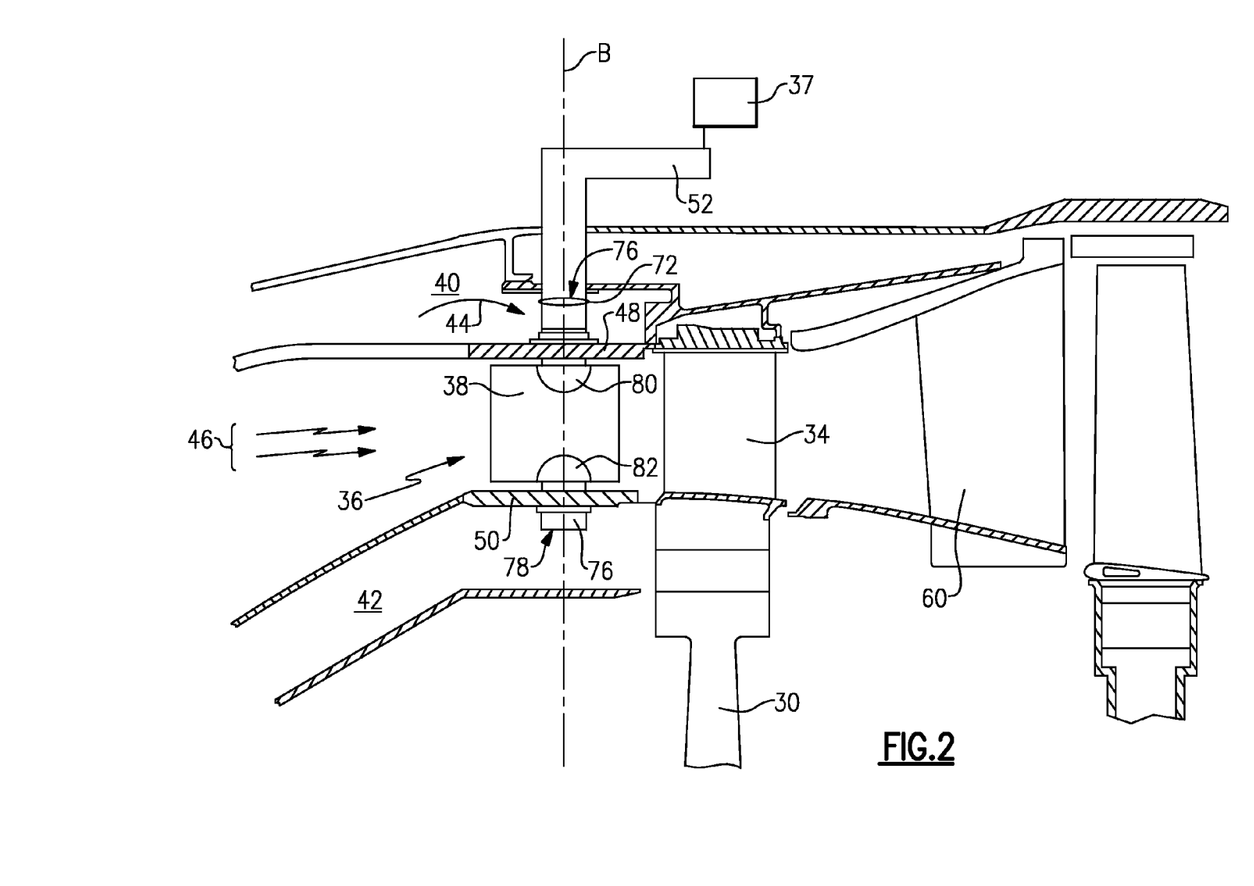
FIG. 2 is a cross-sectional view of a turbine section of the example gas turbine engine.
Figure 3:
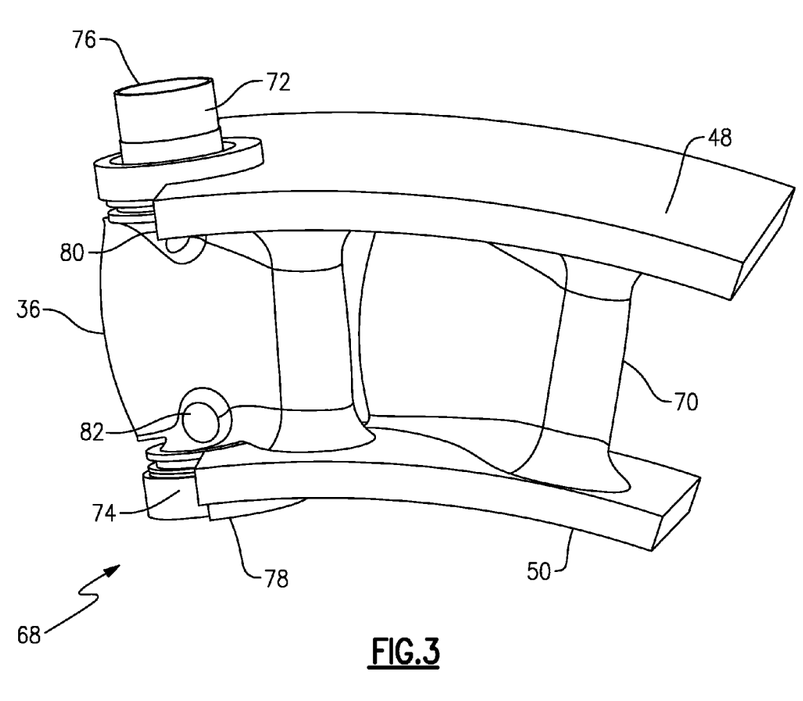
FIG. 3 is a perspective view of an example vane section.

Referring to FIG. 2, with continued reference to FIG. 1, the example gas turbine engine 10 is a variable cycle engine that includes a variable stator vane assembly 36 for adjusting operation of the engine to optimize efficiency based on current operating conditions. The variable stator vane assembly 36 includes airfoils 38 that are rotatable about an axis B transverse to the engine longitudinal axis A through a predetermined centroid of each individual airfoil. Adjustment and rotation about the axis B of each of the airfoils 38 varies gas flow rate to further optimize engine performance between a high powered condition and partial power requirements, such as may be utilized during cruise operation. In the disclosed example, the stator vane assembly 36 is disposed within the turbine section 18, however it will be recognized that this disclosure may be applied to any variable vane that utilizes cooling airflow, such as for example within the compressor section 14.

The example turbine section includes a rotor 30 that supports a plurality of turbine blades 34. A fixed vane 60 is provided along with a variable vane assembly 36. The variable vane assembly 36 includes the airfoil 38 that is rotatable about the axis B. The variable stator vane assembly 36 receives cooling airflow 44 from an inner plenum 42 and an outer plenum 40. The airflow is required as the high energy gas flow 46 is of a temperature that exceeds material performance capabilities. Accordingly, cooling air 44 is provided to the variable stator vane assembly 36 to maintain and cool the airfoil 38 during operation.

The variable stator vane assembly 36 includes the airfoil 38 that is supported between an outer platform 48 and an inner platform 50 by an outer spindle 72 and an inner spindle 76. The outer spindle 72 includes a feed opening 76 through which cooling air 44 is communicated. The inner spindle 76 includes a feed air opening 78 through which cooling air 44 is also communicated. The cooling air 44 is communicated through the outer plenum 40 and an inner plenum 42 to the corresponding feed opening 76, 78. The cooling air is communicated through the feed air openings 76, 78 to provide cooling air into an internal chamber 88 (FIG. 7) of the airfoil 38. The airfoil 38 is rotatable about the axis B and includes an actuating arm 52 that is articulated and moved in response to commands and operation of an actuator 54.

The flow of cooling air into the variable stator vane assembly 36 affects the optimal operation of the gas turbine engine. In this example, the cooling airflow 44 is taken from a portion of the compressor section 14 and communicated through the inner and outer plenums 42, 40 to provide the cooling airflow to the airfoil 38 within the hot gas flow passage.

The cooling airflow required to cool the variable vane assembly 36 must all flow through the inner and outer spindles 72, 76. The inner and outer spindles 72, 76 are of a reduced size and, therefore, provide smaller openings 78, 76 for the cooling airflow. The smaller openings limit the available flow and therefore limit cooling airflow into the airfoil 38. This limiting or choking of flow increases flow losses that then require additional cooling pressure and airflow that can reduce engine operating efficiencies. Accordingly, it is desirable to limit and minimize flow losses of cooling air into the variable vane assembly.

Referring to FIGS. 3, 4, 5 and 6 with continued reference to FIG. 2, an example vane assembly 68 includes the outer platform 48 and the inner platform 50 that supports a fixed vane 70 and the articulating or variable stator vane assembly 36. The variable stator vane assembly 36 includes the airfoil 38 supported between the outer platform 48 and the inner platform 50 by the outer spindle 72 and the inner spindle 74. The spindles 72, 74 define respective ones of the outer feed opening 76 and the inner feed opening 78.

The airfoil 38 includes a leading edge 56 and a trailing edge 58. Walls of the airfoil define a pressure side 60 that is spaced apart from a suction side 62. The airfoil 38 further extends radially between an inner side 64 and an outer side 66. Air flow is communicated into a chamber 88 defined within the airfoil 38 by the inner and outer feed opening 76, 78.

An outer protrusion 80 and an inner protrusion 82 are defined by the airfoil wall 98 to provide a reduced restriction to air flow entering the chamber 88.

Figure 4:
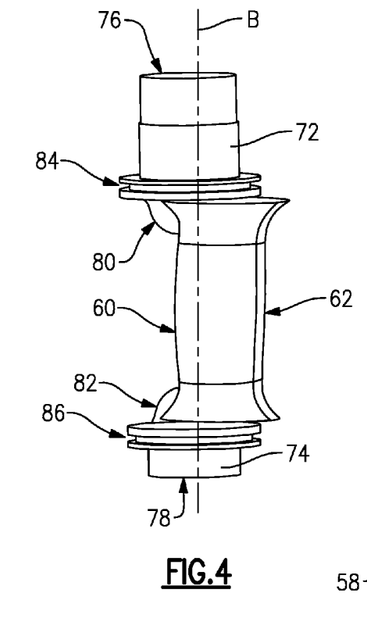
FIG. 4 is a front view of the articulating vane assembly.
Figure 5:
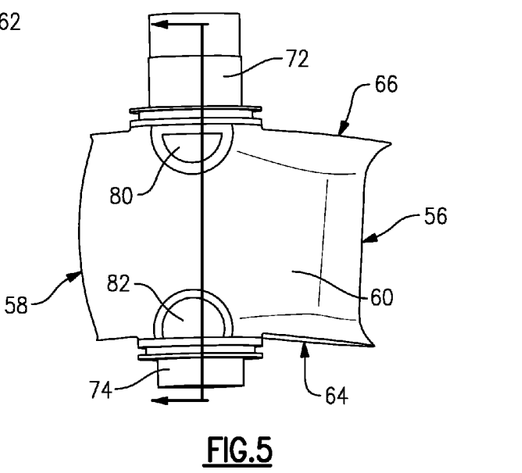
FIG. 5 is a pressure side of the example articulating vane.
Figure 6:
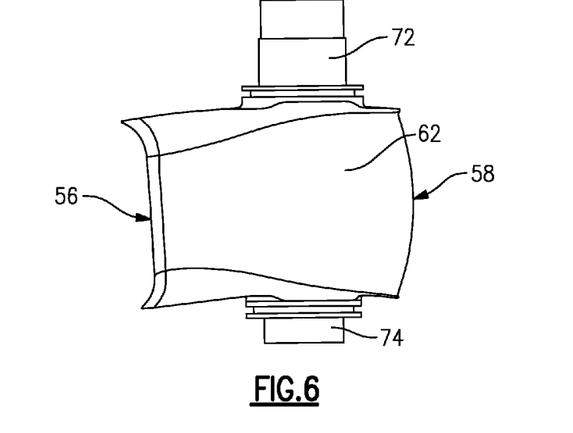
FIG. 6 is a suction side view of the example articulating vane.
Figure 7:
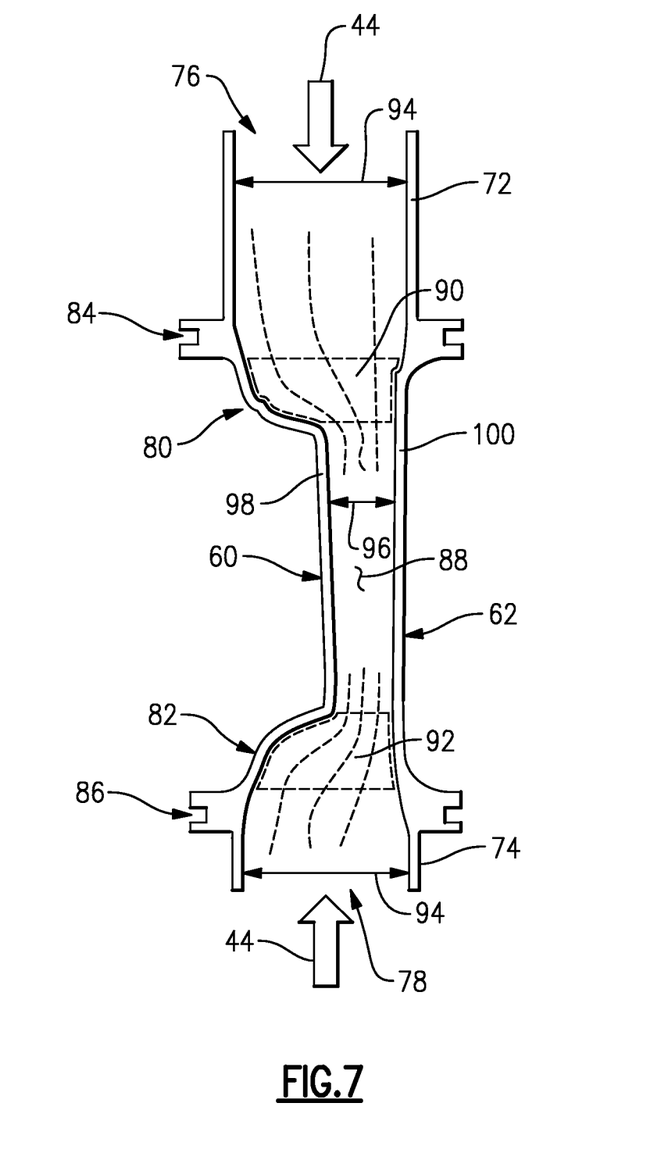
FIG. 7 is a cross-sectional view of the example articulating vane.

Referring to FIG. 7 with continued reference to FIGS. 4, 5 and 6, the example chamber 88 is an open area defined between walls 98 and 100 of the airfoil 38. Cooling air flow 44 enters the chamber 88 through the outer feed opening 76 and the inner feed opening 78. The chamber 88 includes a cord wise maximum width 96 that is much less than a cord wise width 94 of each of the feed openings 76, 78. The transition between the width 94 and the width 96 generates substantial flow losses due to the constriction between the two widths.

The example airfoil 38 includes inner and outer inlet regions 90, 92. The outer inlet region 90 and the inner inlet region 92 are disposed between the respective outer feed opening 76 and the inner feed opening 78 and the chamber 88. The inlet regions 90, 92 provide a transition between the larger width 94 of the feed air openings and the smaller width 96 of the chamber 88. The tapered configuration and contour of the inlets 90 and 92 is provided by corresponding protrusions 80, 82 that bump the pressure side wall 90 outward into the gas flow stream. Protrusions 80, 82 are disposed proximate the corresponding spindles and provide a contoured transition between the feed openings 78, 76 and the chamber 88. The smoother transition limits flow losses that are produced by flowing cooling air into the smaller width 96 of the inner chamber 88.

In this example, a protrusion is provided at both the outer spindle 72 and the inner spindle 74. However, a single protrusion could be utilized and is within the contemplation of this disclosure.

Each of the outer spindle 72 and the inner spindle 74 includes bearing races 84, 86 that support rotation of the airfoil 38 within the vane section 68. The protrusions 80, 82 are disposed on a side of the bearing races 84, 86 that are within the gas flow path and, therefore, must provide minimal interference with the desired aerodynamic performance of the airfoil 38.

The example protrusions 80, 82 are provided on the pressure side 60 of the airfoil 38 and do not affect air flow over the airfoil and provide a better transition for cooling air flow to be communicated to the inner chamber 88.

The protrusions 80, 82, as are shown in FIGS. 4 and 5, provide a minimal interference with aerodynamic flow across the airfoil 38. The protrusions extend a radial length from the corresponding spindles 72, 74 that is less than the longitudinal length or width of the airfoil 38. The example configuration and shape of the protrusions 80 and 82 provide minimal aerodynamic interference with air flow over the airfoil.

In this example, the protrusions define a symmetric ellipsoid shape that protrudes into the flow path, but still provides minimal interference with the aerodynamic properties of the example airfoil 38.

Figures 8A, 9A:
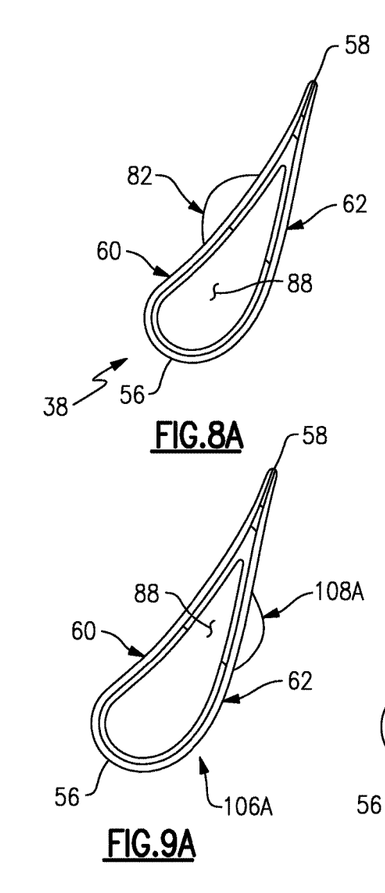
FIGS. 8A-8D are schematic views of example protrusions provided on a pressure side of the example articulating vane assembly.
FIGS. 9A-9D are schematic view of example protrusions provided on a suction side of the example articulating vane assembly.

Referring to FIG. 8A, the example protrusion 82 is shown in cross-section and is defined on the pressure side 60. The example protrusion 82 is a symmetric ellipsoid shape that provides a substantially spherical shape on the pressure side of the example airfoil 38.

Figure 8B:
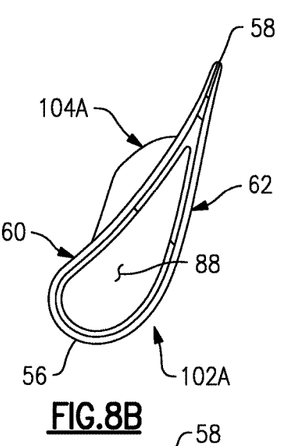

Although a symmetric ellipsoid shape is disclosed, other shapes of the protrusion are also within the contemplation of this disclosure. Referring to FIG. 8B, another protrusion 104A is disclosed in another airfoil example 102A. In this example, the protrusion 104A includes an expanded ellipsoid shape that extends further towards the leading edge 56 and the trailing edge 58.

Figure 8C:
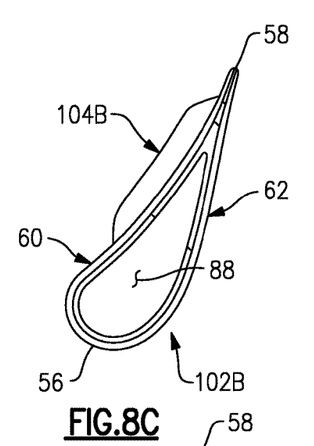

Referring to FIG. 8C, another disclosed airfoil embodiment 102B includes a protrusion 104B that includes a flat portion that extends along a cord wise length of the airfoil 102B. In each of the examples, the protrusions 104B, 104A and 82 extend only partially within a longitudinal length of the airfoil 38 such as to minimize interference with air flow across the airfoil 38.

Figure 8D:
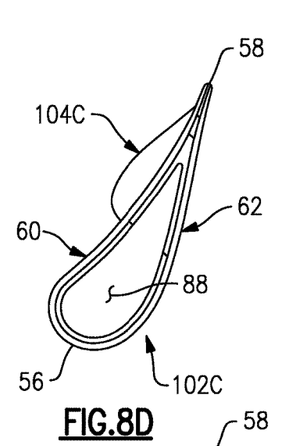

Referring to FIG. 8D, another example airfoil 102C includes a protrusion 104C that is disposed substantially towards the trailing edge 58 of the example airfoil 102C.

The example protrusions shown in FIGS. 8A-D extend from a pressure side 60. Referring to FIGS. 9A-D, the protrusions are configured on the suction side 62. Referring to FIG. 9A, the protrusion 108A disclosed in the airfoil 106A includes a protrusion that extends outward from the suction side 62.

Figure 9B:
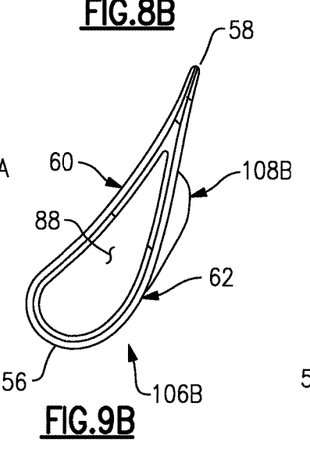

Referring to FIG. 9B, another airfoil 106B includes a protrusion 108A that is an elongated shape that protrudes outward from the suction side 62.

Figure 9C:
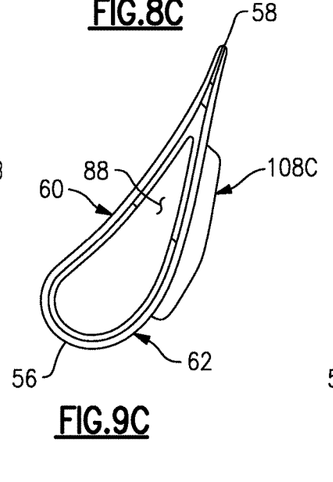

Referring to FIG. 9C, another airfoil configuration 106C includes a protrusion 108A that extends over a substantially longer portion of the cord wise length of the airfoil 106C.

Figure 9D:
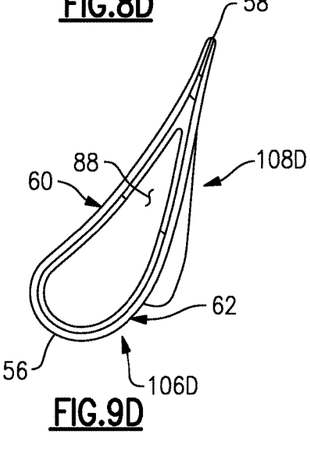

Referring to FIG. 9D, an example protrusion 108D extends from the suction side 62 of yet another airfoil example 106D. The protrusion shape extends outward and tapers inward towards the trailing edge 58. It should be appreciate that although several examples are illustrated for the shape of the protrusion providing for the contoured and reduced cooling air flow losses other shapes may also be utilized and are within the contemplation of this disclosure.

Accordingly, the example protrusions extending outward from the airfoil provide additional space within the interior of the example airfoil to minimize flow losses and improve cooling air efficiency for the example articulating turbine vane assembly.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vane assembly for a gas turbine engine comprising:
   an airfoil rotatable about an axis transverse to an engine longitudinal axis, the airfoil including outer walk defining an inner chamber between a pressure side and a suction side of the airfoil, the airfoil disposed within a gas flow path defined by a flow through a compressor section, a combustor and a turbine section of the gas turbine engine; and
   at least one spindle supporting rotation of the airfoil, the at least one spindle including a feed opening for communicating cooling air into the inner chamber; and
   an inlet defining a passage between the feed opening and the inner chamber, the inlet defined by a protrusion of the outer wall on at least one of the pressure side and suction side of the airfoil within the gas flow path.

2. The vane assembly as recited in claim 1, wherein the protrusion extends outward from a pressure side of the airfoil.

3. The vane assembly as recited in claim 1, wherein the protrusion extends outward from a suction side of the airfoil.

4. The vane assembly as recited in claim 1, wherein the at least one spindle comprises an outer spindle and an inner spindle each including a feed opening and the inlet comprises an outer inlet and an inner inlet each forming a protrusion on the outer wall.

5. The vane assembly as recited in claim 1, wherein the passage defined by the inlet tapers from a first width defined by the feed opening to a second width smaller than the first width defined by the inner chamber.

6. The vane assembly as recited in claim 1, wherein the protrusion comprises an ellipsoid shape extending from at least one of the pressure side and suction side of the airfoil.

7. The vane assembly as recited in claim 1, wherein the pressure side and suction side extend a first radial length from an inner side to an outer side and the protrusion is less than the first length.

8. The vane assembly as recited in claim 1, wherein the protrusion comprises a first protrusion extending radially inward from the outer side and a second protrusion extending radially outward from the inner side.

9. The vane assembly as recited in claim 1, including an outer platform and an inner platform with the airfoil supported between the outer platform and the inner platform.

10. The vane assembly as recited in claim 9, including a fixed airfoil supported between the inner platform and the outer platform adjacent the airfoil.

11. The vane assembly as recited in claim 1, wherein the at least one spindle includes a bearing race for bearings to support rotation of the airfoil and the protrusion is disposed on a side of the bearing race that is within the gas flow path.

12. A turbine section of a gas turbine engine comprising:
   at least one rotor supporting rotation of a plurality of blades about an engine longitudinal axis; and
   at least one variable vane rotatable about an axis transverse to the engine rotational axis for varying a direction of airflow, the variable vane including an airfoil rotatable about an axis transverse to an engine longitudinal axis within a gas flow path defined by a flow through a compressor section, a combustor and the turbine section of the gas turbine, the airfoil including outer walls defining an inner chamber between a pressure side and a suction side of the airfoil, at least one spindle supporting rotation of the airfoil, the at least one spindle including feed opening for communicating cooling air into the inner chamber, and an inlet defining a passage between the feed opening and the inner chamber, the inlet defined by a protrusion of the outer wall on at least one of the pressure side and suction side of the airfoil that extends into the gas flow path.

13. The turbine section as recited in claim 12, wherein the at least one spindle comprises an outer spindle and an inner spindle each including a feed opening and the inlet comprises an outer inlet and an inner inlet each forming a protrusion on the outer wall.

14. The turbine section as recited in claim 12, wherein the passage defined by the inlet tapers from a first width defined by the feed opening to a second width smaller than the first width defined by the inner chamber.

15. The turbine section as recited in claim 12, wherein the protrusion comprises an ellipsoid shape extending from at least one of the pressure side and suction side of the airfoil.

16. The turbine section as recited in claim 12, including an outer platform and an inner platform with the variable vane supported adjacent a fixed vane between the outer platform and the inner platform.

17. The turbine section as recited in claim 16, including a plurality of variable vanes and a plurality of fixed vanes defining a vane stage of the turbine section and alternating about the engine longitudinal axis.

18. The turbine section as recited in claim 12, wherein the at least one spindle includes a bearing race for bearings to support rotation of the airfoil and the protrusion is disposed on a side of the bearing race that is within the gas flow path.

19. A gas turbine engine comprising:
   a compressor section;
   a combustor in fluid communication with the compressor section; and
   a turbine section in fluid communication with the combustor; the turbine section including at least one rotor supporting rotation of a plurality of blades about an engine longitudinal axis; and
   at least one variable vane rotatable about an axis transverse to the engine rotational axis for varying a direction of airflow of a gas flow stream through a gas flow path defined by a flow through the compressor section, the combustor and the turbine section, the variable vane including an airfoil rotatable about an axis transverse to an engine longitudinal axis, the airfoil including outer walls defining an inner chamber between a pressure side and a suction side of the airfoil, at least one spindle including a bearing disposed within a bearing race for supporting rotation of the airfoil, the at least one spindle including feed opening for communicating cooling air into the inner chamber, and an inlet defining a passage between the feed opening and the inner chamber, the inlet defined by a protrusion of the outer wall on at least one of the pressure side and suction side of the airfoil and on a side of the bearing race and extending within the gas flow path.

20. The gas turbine engine as recited in claim 19, wherein the at least one spindle comprises an outer spindle and an inner spindle each including a feed opening and the inlet comprises an outer inlet and an inner inlet each forming a protrusion on the outer wall.

21. The gas turbine engine as recited in claim 19, wherein the passage defined by the inlet tapers from a first width defined by the feed opening to a second width smaller than the first width defined by the inner chamber.

22. The gas turbine engine as recited in claim 19, including an outer platform and an inner platform with the variable vane supported adjacent a fixed vane between the outer platform and the inner platform.

* * * * *